H. L. TURNEY AND A. G. LABBÉ.
LOCOMOTIVE.
APPLICATION FILED MAR. 17, 1920.
1,371,712.
Patented Mar. 15, 1921.
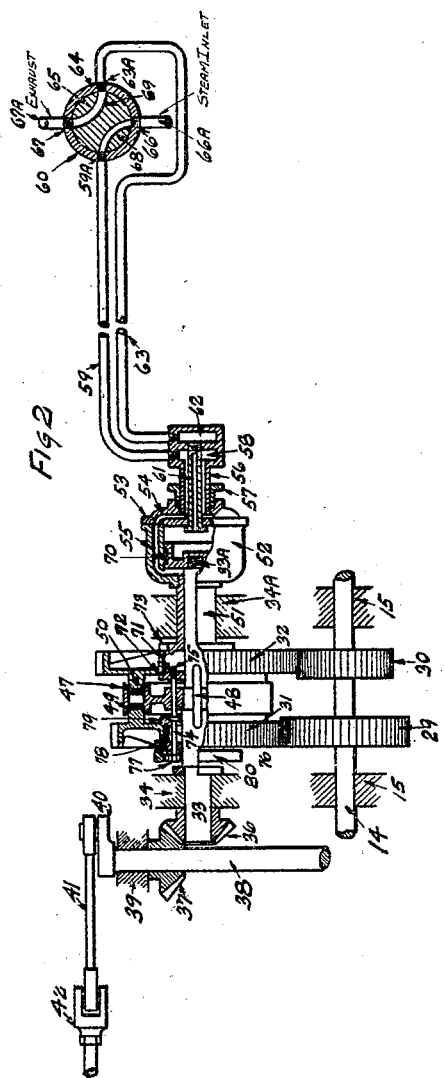
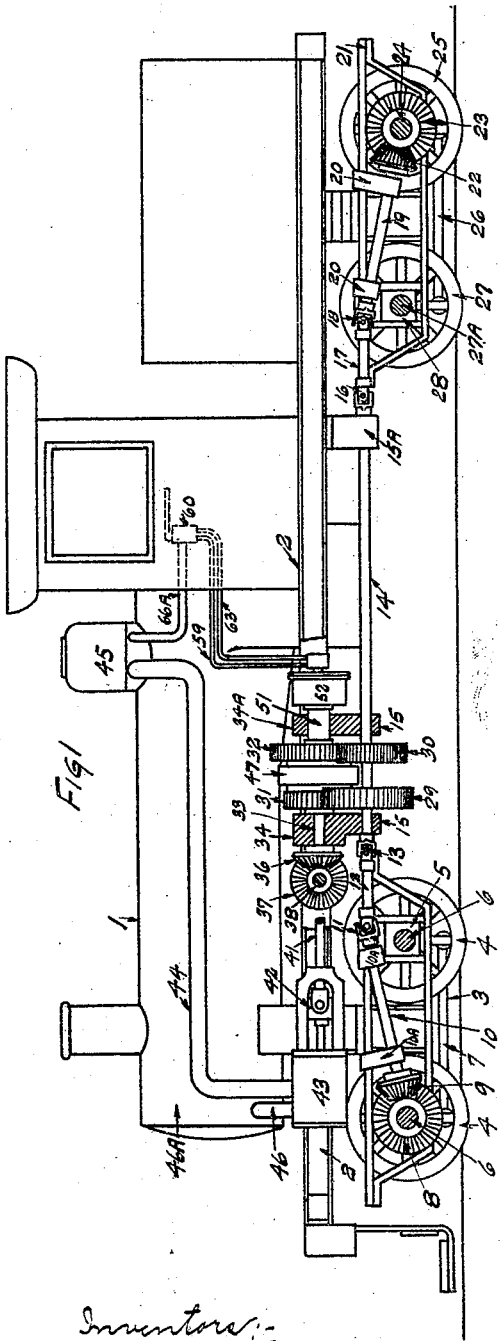

UNITED STATES PATENT OFFICE.

HARRY L. TURNEY AND ANTOINE G. LABBÉ, OF PORTLAND, OREGON.

LOCOMOTIVE.

1,371,712.  Specification of Letters Patent.  Patented Mar. 15, 1921.

Application filed March 17, 1920. Serial No. 366,575.

*To all whom it may concern:*

Be it known that we, HARRY L. TURNEY and ANTOINE G. LABBÉ, citizens of the United States, residing at Portland, in the county of Multnomah and State of Oregon, have invented new and useful Improvements in Locomotives, of which the following is a specification.

In the use of locomotives, particularly in the logging industry, it is necessary to have a very large draft capacity and this must be confined within moderate weights because ordinarily such lumber roads are of temporary construction. To accomplish this purpose most locomotives used in this and similar industries are provided with gears through which the power is transmitted. This makes possible the extension of the number of wheels involved in the driving action and also the possibility of greater traction with a lighter-powered engine. The disadvantage of this construction is that in the low gearing necessary to give the added draft capacity the ultimate speed of the engine is necessarily very much reduced and thus the capacity of the engine particularly if the haul extends over any distance is correspondingly reduced. The object of the present invention is to provide a transmission for such locomotive which will permit of the changing of the gear ratio in a practical manner.

The invention is illustrated in the accompanying drawings as follows:—

Figure 1 is a side elevation of a locomotive, a part being shown in vertical longitudinal section.

Fig. 2 is an enlarged plan view of the transmission mechanism.

1 marks the locomotive boiler, 2 the frame, 3 the truck, 4 the driving wheels, 5 bearings mounted in the truck in which the axles 6 are journaled, 7 a connecting rod between the wheels, 8 a beveled gear mounted on one of the axles, 9 a beveled gear meshing the gear 8, 10 a shaft extending from the gear 9, 10$^a$ bearings in which the shaft 10 is mounted, said bearings being carried by the frame, 11 a knuckle joint, 12 a link connecting a second element 13 of the universal joint, and 14 a longitudinal shaft extending from the knuckle joint 13, said shaft being mounted in bearings 15, 15 and 15$^a$ carried in cross pieces of the frame. The rear end of the shaft 14 is connected by a knuckle joint 16 with a link 17. The link 17 is connected with a knuckle joint 18. A shaft 19 is journaled in bearings 20 carried by the truck 21. A beveled gear 22 is arranged on the shaft 19 and meshes a beveled gear 23 on the axle 24. A driver 25 is mounted on the axle 24. A connecting rod 26 connects the wheel 25 with a wheel 27. The wheel 27 is mounted on an axle 27$^a$. The axles are carried in bearings 28 mounted in the truck. The specific arrangement of gearing from the axles may be changed without departing from the invention.

Gears 29 and 30 are fixed on the shaft 14. These gears are of different diameters and mesh the gears 31 and 32 respectively. Gears 31 and 32 are fixed on a shaft 33. The shaft 33 is journaled in bearings 34 and 34$^a$ in the cross pieces on the frame carrying the bearings 15. A beveled gear 36 is fixed on the front end of the shaft 33 and meshes with a beveled gear 37 on a cross shaft 38. The cross shaft 38 is journaled in bearings 39 in the frame. Cranks 40 are arranged on the ends of the shaft 38. The connecting rods 41 of the engines are connected to the cranks 40 and extend to the cross head 42. The engine cylinder 43 is mounted in the usual manner. It has a steam pipe 44 extending from the dome 45 and an exhaust 46 extending to the smoke box 46$^a$. It will be noted that this construction permits the mounting of the engine in very much the same manner as the engines are mounted in standard locomotives.

A clutch driving element 47 is fixed by means of a key 48 on the shaft 33. It is provided on its opposing faces with friction clutch surfaces 49 which are positioned to be engaged by annular friction clutch surfaces 50 carried on the opposing faces of the gears 31 and 32. A sleeve 51 surrounds the shaft 33 and extends through a bearing 34$^a$. The outer end of this sleeve is connected with a cylinder 52. The cylinder is provided with a head 53. A port 54 in the head communicates with a port 55 leading to the inner end of the cylinder. The port 54 communicates with a sleeve 56. The sleeve 56 extends through a gland 57 on the head 53 and communicates with a connection 58 at the outer end of the sleeve. A supply pipe 59 extends from the connection 58 to a valve 60. The outer end of the cylinder communicates through a tube 61 with a connection 62 and a pipe 63 leads from the connection 62 to the valve 60. The valve 60 is provided with a body 64 in which is arranged a plug 65. The pipe 59 leads to a port 59ª and the pipe 63 leads to a port 63ª. A port 66 communicates through a pipe 66ª with the dome of the boiler and a port 67 leads through a pipe 67ª to any convenient exhaust. The valve is of the four-way type. It has the ways 68 and 69. It will be readily seen that by shifting the plug 65 either the pipe 59 or 63 may be connected to the steam inlet and that the other of said pipes when connection is made with one of the pipes 59 or 63 will be connected with the exhaust and that by throwing the valves both of said pipes may be disconnected from the inlet.

The outer end of the shaft 33 is screw-threaded at 33ª and is secured to the piston 70. The inner end of the sleeve 51 has a bearing surface 71 on which the gear 32 is journaled. The gear is locked against axial movement on this surface by a shoulder 72 and a collar 73. A rod 74 has a screw-threaded end 75 which engages the end of the sleeve 51 and extends through the driving element 47. It is provided with a collar 76 and a head 77 which engage a bearing block 78. The gear 31 is journaled on the bearing block 78 and is locked against axial movement relatively to the block by means of the shoulders. The shaft 33 is locked against axial movement by the gear 36 at the side of the bearing 34 and a collar 80.

The operation of this transmission is as follows:—The shaft 33 is driven from the engine and this rotates the driving element 47. If there is no steam on the cylinder 52 the gears 31 and 32 run free on their bearings. If, however, steam is turned on to the inner end of the cylinder the piston 70 being secured to the shaft 33 and the shaft 33 locked against axial movement remains stationary while the cylinder moves through the influence of steam pressure carrying with it the sleeve 51 and the gear 32 so as to force the friction surface on the gear 32 into engagement with the driver. The transmission is then through the gear 32 and gear 30 which may be termed the high-speed connection because the gear 32 is larger than the gear 31 and the gear 30 is smaller than the gear 29. If the conditions of use require a greater power the steam is reversed in the cylinder 52 and the steam pressure operating on the cylinder in the opposite direction draws the sleeve 51 so as to disengage the gear 32 and acting through the rods 74 the gear 31 is moved to bring its friction surface into engagement with the driver and the driving is then through the gears 31 and 29. This may be termed the low speed connection. It will readily be seen that this shift may be readily made while the locomotive is running and consequently the shock of picking up and letting go of the slack which would occur in a train may be avoided. The clutch permits of the use of the steam from the locomotive and this pressure varying as the driving pressure on the engine varies makes it possible to proportion the clutch surfaces so as to make the driving action certain with a smaller allowance than would be possible without this relationship. By placing the transmission on the longitudinal shaft it may be conveniently arranged with relation to the frame and to the boiler and other working parts.

What is claimed as new is:—

1. In a locomotive, the combination of drive wheels; a motor driving said wheels; a gear transmission between the motor and the wheels, said transmission comprising gear trains varying the speed ratio between the motor and the wheels; a clutch mechanism comprising friction clutches in each train; and fluid-actuated means for operating said clutches.

2. In a steam locomotive, the combination of drive wheels; a boiler mounted on said wheels; engines supplied from said boiler; means for communicating movement from the engines to the wheels comprising a gear transmission having trains giving different speed ratios; clutch mechanism for throwing in and out the different gears of said transmission to vary the speed ratio; and fluid actuated means connected with the boiler for operating said clutch mechanism.

3. In a steam locomotive, the combination of drive wheels; a boiler mounted on said wheels; engines supplied from said boiler; means for communicating movement from the engines to the wheels comprising a gear transmission having trains giving different speed ratios; friction clutch mechanism for throwing in and out the different gears of said transmission to vary the speed ratio; and fluid actuated means connected with the boiler for operating said clutch mechanism.

4. In a steam locomotive, the combination of a boiler; drive wheels on which the boiler is mounted; engines arranged longitudinally of the boiler; a cross shaft operated by the engine; a longitudinal shaft driven from the cross shaft; a second longitudinal shaft; means connecting said second longitudinal shaft with the drive wheels; a gear transmission arranged between the longitudinal shafts comprising trains of gearing of different speed ratio; and means for throwing into and out of engagement said trains of gearing.

5. In a steam locomotive, the combination of a boiler; drive wheels on which the boiler is mounted; engines arranged longitudinally of the boiler; a cross shaft operated by the engine; a longitudinal shaft driven from the cross shaft; a second longitudinal shaft; means connecting said second longitudinal shaft with the drive wheels; a gear transmission arranged between the longitudinal shafts comprising trains of gearing of different speed ratio; means for throwing into and out of engagement said trains of gearing comprising a clutch mechanism; and fluid actuated means for actuating said clutch mechanism connected with the boiler.

6. In a steam locomotive, the combination of a boiler; drive wheels on which the boiler is mounted; engines arranged longitudinally of the boiler; a cross shaft operated by the engine; a longitudinal shaft driven from the cross shaft; a second longitudinal shaft; means connecting said second longitudinal shaft with the drive wheels; a gear transmission arranged between the longitudinal shafts comprising trains of gearing of different speed ratio; means for throwing into and out of engagement said trains of gearing comprising a friction clutch mechanism; and fluid actuated means for actuating said clutch mechanism connected with the boiler.

In testimony whereof we have hereunto set our hands.

HARRY L. TURNEY.
ANTOINE G. LABBÉ.